June 23, 1959
R. L. BRIGHT
2,892,101
TRANSISTOR TIME DELAY CIRCUIT
Filed April 25, 1956
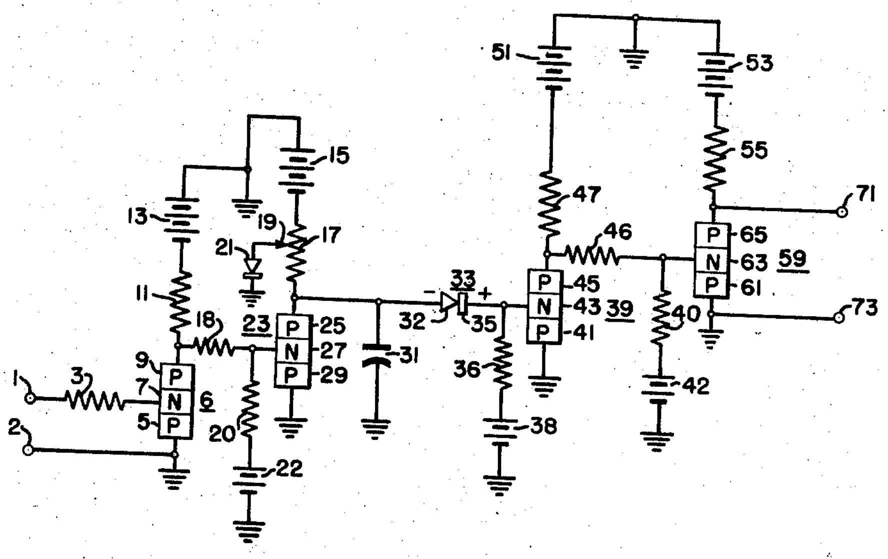
WITNESSES:
Bernard R. Gieguez
Leon M. Garman
INVENTOR
Richard L. Bright
BY
John B. Davidson
ATTORNEY 2,892,101

TRANSISTOR TIME DELAY CIRCUIT

Richard L. Bright, Hempfield Township, Westmoreland County, Pa., assignor to Westinghouse Electric Corporation, East Pittsburgh, Pa., a corporation of Pennsylvania Application April 25, 1956, Serial No. 580,579

6 Claims. (Cl. 307—88.5)

This invention relates to time delay circuits, and more particularly to time delay circuits making use of static switching elements.

It has been known in the prior art to utilize time delay circuits having a resistance-capacitance circuit connected across a direct current supply as the main timing element, the voltage across the capacitor being the timing parameter. Many of these devices have been found to be quite temperature sensitive. Particularly when they are exposed to very low temperatures such as are encountered in outdoor installations of the nature of pole transformer tap changers, these devices often have been proven unsatisfactory.

Further, the triggering action of stages following the timing capacitor should be very precise for timing accuracy. When the capacitor attains a predetermined voltage, there should be a short transition time from one conductive state to the other in the stages following the timing capacitor. Often this is not the case with prior art devices, the transition voltage varying considerably due to changes in circuit parameters not readily controllable by an operator.

One object of this invention is to provide a time delay circuit having reliable operating characteristics over a wide range of ambient temperature.

Another object is to provide a time delay circuit not radially effected by changes in characteristics in circuit components.

Still another object is to provide a time delay circuit of the type wherein the principal timing component is a series resistance-capacitance network wherein, in the stage following the network, the change from one conductive state to the other is very sharp, precise and not readily effected by changes in the characteristics of circuit components thereof.

One feature of this invention lies in the use of a series resistance-capacitance circuit for actuating a transistor switch through a coupling device that breaks down to provide a sharp inrush of triggering current to the transistor when the voltage across the capacitor reaches a given value. The capacitor is normally short circuited; when the short circuit is removed, the voltage across the capacitor increases at a rate determined by the relative values of the resistor and capacitor and of a D.C. voltage applied thereacross. The coupling device, which in a preferred embodiment is a Zener diode, breaks down when the voltage across the capacitor reaches a predetermined value. The sharp inrush of current to the transistor control circuit renders the transistor conducting. This transistor switch controls still another normally conducting transistor switch, which is now rendered non-conducting to remove a short circuit across a pair of output terminals in the output circuit of the last named transistor, the emitter-collector bias voltage of the last named transistor now appearing as the output voltage of the over-all circuit.

Other objects and features of the invention will become apparent upon consideration of the following description thereof when taken in conjunction with the accompanying drawing, wherein the single figure depicts a schematic circuit diagram of a typical embodiment of the invention.

In more particular, and with reference to the figure, there is shown a serially-connected resistor 17 and capacitor 31 which are connected across the source of direct current 15. For the purpose of stabilizing the voltage applied to the capacitor, a Zener diode 21 is connected to a tap 19 on resistor 17. The Zener breakdown voltage of the diode should be somewhat less than the normal voltage at tap 19 so that the diode can properly exert a regulating effect. The cathode of the diode is connected to ground, i.e. to the terminal of capacitor 31 that is not connected to resistor 17. The emitter 25 of a p-n-p junction-type transistor is connected to the juncture of resistor 17 and capacitor 31, and the collector 29 of transistor 23 is connected to ground. Transistor 23 is preferably of the fused junction type so that when saturating collector current is flowing therethrough, the emitter-collector impedance is extremely low, thus effectively short-circuiting capacitor 31.

A bias source 22 is coupled between base 27 and collector 29 by means of current limiting resistor 20 so as to bias transistor 23 to collector current cutoff with no external signal applied to base 27. The collector 9 of a second switching transistor 6, having characteristics substantially the same as those of transistor 23, is coupled to base 27 by isolating resistor 18. Emitter-collector bias voltage for transistor 6 is derived from bias source 13, which is coupled to the transistor by means of impedance 11. A pair of input terminals 1, 2 are coupled to the base 7 and emitter 5 of transistor 6 by resistor 3, emitter 5 being also connected to ground. Transistor 6 is normally non-conducting, a pulse applied to terminals 1, 2 being of a polarity to render the transistor conducting to collector current saturation.

The values of resistors 11, 18 and 20 are chosen so that with transistor 6 non-conducting, bias source 13 overcomes bias source 22 to render transistor 23 conducting to saturation, but when transistor 6 is conducting to saturation, bias source 22 overcomes bias source 13 to render transistor 23 non-conducting.

A third switching transistor 39, having characteristics similar to the aforedescribed transistors, is coupled to an emitter-collector bias source 51 by means of impedance 47. Bias source 51 is further coupled to the base 63 of a fourth switching transistor 59 through serially-connected resistors 47 and 46. Both switching transistors are p-n-p type junction transistors. The positive terminal of bias source 51 is connected to ground as is the emitter 61 of transistor 59. Another bias source 42 is coupled between emitter 61 and base 63 by means of resistor 40. Emitter-collector bias for transistor 59 is provided by means of bias source 53, the negative terminal of which is coupled to collector 65 by means of impedance element 55. Output terminals 71 and 73 are respectively connected to collector 65 and emitter 61. The relative impedances of resistors 40, 46 and 47 are chosen so that with transistor 39 non-conducting, bias source 51 overcomes bias source 42 to drive transistor 59 to collector current saturation, and further, with transistor 39 conducting to collector current saturation, bias source 42 will be effective to bias transistor 59 to collector current cut off.

As has been described in a prior filed application, Serial No. 420,904 of R. L. Bright et al., entitled "Transistor Power Control Circuits," filed April 5, 1954, a junction-type transistor of the p-n-p type is rendered conducting to collector current saturation when the base is at a negative potential with respect to one of the adjacent electrodes, and the collector current is cut off when the base is positive with respect to both adjacent electrodes.

Transistor 39 is normally biased to cut off by means of bias source 38 coupled between base 43 and emitter 41 by means of current limiting resistor 36. Capacitor 31 is coupled between emitter 41 and base 43 by means of Zener diode 33, the anode 32 of diode 33 being connected to emitter 25 of transistor 23 and anode 35 being connected to base 43 of transistor 39. The diode 33 is preferably of the p-n junction type having a very sharp Zener breakdown characteristic. Reference is made to the article "Observations of Zener Current in Germanium P–N Junctions" by R. B. McAfee et al., appearing in "Physical Review," volume 83, pages 650 to 651 (1951), for a discussion of the Zener current breakdown phenomena. The Zener breakdown voltage must be sufficiently great to drive transistor 39 to collector current saturation; i.e. to place base 43 at a negative potential with respect to emitter 41.

As will be appreciated from the above description to the circuitry, with no signal applied between terminals 1 and 2, transistors 6 and 39 will be cut off, and transistors 23 and 59 will be at collector current saturation. Capacitor 31 will be short-circuited, as will be output terminals 71 and 73. Since resistor 55 is effectively connected to ground by means of the low impedance between emitter 61 and collector 65, no output voltage will appear across terminals 71 and 73. Assume now that a signal is applied to terminals 1, 2 sufficient to drive transistor 6 to collector current saturation. Bias source 22 will now overcome bias source 13 to drive transistor 23 to collector current cut off. Capacitor 31 will now begin charging in accordance with the exponential law associated with a serially-connected RC circuit connected across a constant-connected potential voltage source. When the voltage across capacitor 31 reaches the Zener breakdown voltage of Zener diode 33, the Zener diode will break down, and a sharp inrush of current will flow through the emitter-base circuit of transistor 39, driving transistor 39 t collector current saturation. The juncture of resistors 46 and 47 will now effectively be at ground, and bias source 42 will be effective to cut off the flow of collector current through transistor 59. The output voltage of bias source 53 will now appear between output terminals 71 and 73. The time delay between the application of input terminals 1 and 2 and the appearance of an output voltage across terminals 71, 73 will be almost exactly the time required for capacitor 31 to reach the Zener breakdown voltage of diode 33 inasmuch as the time delays associated with the other components in the circuit are negligible.

The time delay of the circuitry described above has been found to be reliable to within 3 to 5% over a temperature range extending at least between the ranges −60° C. to +60° C. Variation in the characteristics of the circuit components, other than the Zener diode, does not particularly effect the operation of the circuit. Since the Zener diode is extremely reliable, it is perhaps the least critical of the various components in the circuit. The transition from one conducting condition to the other of the stages includes transistors 39 and 59 and has been found to be extremely sharp and precise. The Zener diode breaks down very rapidly at a constant voltage, and the pulse of current into transistor 39 is of such magnitude and has such a steep wave front that there is substantially zero delay in the transition between conditions of current conduction.

Typical values of the circuit components are listed below. These values are intended to be exemplary of an operating embodiment of the invention and are not to be interpreted in a limiting sense, since other values may be substituted to achieve satisfactory operation.

| | | |
|---|---|---|
| Transistors 6, 23, 39 and 59 | | RR87 |
| Zener diode 21 | | IN204 |
| Zener diode 33 | | IN202 |
| Resistor 3 | ohms | 11K |
| Resistor 11 | do | 7.5K |
| Resistor 18 | do | 1.8K |
| Resistor 20 | do | 51K |
| Resistor 17 | do | 50K |
| Resistor 36 | do | 39K |
| Resistor 47 | do | 20K |
| Resistor 46 | do | 5.1K |
| Resistor 40 | do | 20K |
| Resistor 55 | do | 5.1K |
| Capacitor 31 | μf | 50 |
| Bias source 13 | volts | 48 |
| Bias source 22 | do | 12 |
| Bias source 15 | do | 48 |
| Bias source 38 | do | 12 |
| Bias source 51 | do | 48 |
| Bias source 42 | do | 12 |
| Bias source 53 | do | 48 |

The invention is not to be restricted to these specific structural details or circuit connections herein set forth, as various modifications thereof may be effected without departing from the spirit and scope of this invention.

I claim as my invention:

1. In a timing circuit for removing a short-circuit from a pair of output terminals a predetermined time interval after reception of an input signal at input terminals thereof; serially-connected timing resistor means and capacitor means energized by a direct voltage source; first switch means including first and second junction transistor means each having emitter, base and collector electrodes, first and second emitter-collector bias sources for said first and second transistors respectively coupled thereto by first and second resistor means connected to said collector electrodes; resistor means coupling the base electrode of said first transistor means to the collector electrode of said second transistor means, first emitter-base bias means for said second transistor biasing said second transistor to cut-off when said first transistor is at full collector current conduction; said first emitter-collector bias source being effective to overcome said first emitter-base bias means when said first transistor means is non-conducting to bias said second transistor means to full current conduction; Zener diode means coupling said capacitor across said base and emitter of said first transistor when the voltage across said capacitor is greater than the Zener breakdown voltage of said diode to bias said first transistor to full current conduction; third junction transistor means having emitter, base and collector electrodes deriving emitter-collector bias from said direct voltage source, said emitter and collector of said junction transistor means being connected to the terminals of said capacitor; fourth junction transistor means having emitter, collector and base electrodes, third emitter-collector bias means for said fourth transistor means further connected to said base of said third transistor means by coupling resistor means to bias said third transistor means to cut off when said fourth transistor means is rendered non-conducting, second base-collector bias means for said third transistor for rendering said third transistor non-conducting when said fourth transistor means is at full collector current conduction, said input terminals being connected to said emitter and base electrodes of said fourth transistor means so that a signal thereacross may drive said fourth transistor means alternately between collector current cut off and saturation.

2. In a timing circuit for removing a short-circuit from a pair of output terminals a predetermined time interval after reception of an input signal at input terminals thereof; serially-connected timing resistor means and capacitor means energized by a direct voltage source; first switch means including first and second junction transistor means each having emitter, base and collector electrodes; first and second emitter-collector bias sources for said first and second transistors respectively coupled thereto by first and second resistor means connected to said collector electrodes; resistor means coupling the base electrode of said first transistor means to the collector electrode of said second transistor means, first emitter-base bias means for said second transistor biasing said second transistor to cut-off when said first transistor is at full collector current conduction; said first emitter-collector bias source being effective to overcome said first emitter-base bias means when said first transistor means is non-conducting to bias said second transistor means to full current conduction; means coupling said capacitor means across said base and emitter electrodes of said first transistor means when the voltage across said capacitor is greater than a predetermined magnitude to bias said first transistor to full current conduction; means coupling said capacitor across said base and emitter of said first transistor when the voltage across said capacitor is greater than the Zener breakdown voltage of said diode to bias said first transistor to full current conduction; third junction transistor means having emitter, base and collector electrodes deriving emitter-collector bias from said direct voltage source, said emitter and collector of said junction transistor means being connected to the terminals of said capacitor; fourth junction transistor means having emitter, collector and base electrodes; third emitter-collector bias means for said fourth transistor means further connected to said base of said third transistor means by coupling resistor means to bias said third transistor means to cut off when said fourth transistor means is rendered non-conducting, second base-collector means for said third transistor for rendering said third transistor non-conducting when said fourth transistor means is at full collector current conduction, said input terminals being connected to said emitter and base electrodes of said fourth transistor means so that a signal thereacross may drive said fourth transistor means alternately between collector current cut-off and saturation.

3. In a timing circuit for removing a short-circuit from a pair of output terminals a predetermined time interval after reception of an input signal at input terminals thereof; serially-connected timing resistor means and capacitor means energized by a direct voltage source; first switch means including first and second junction transistor means each having emitter, base and collector electrodes, first and second emitter-collector bias sources for said first and second transistor respectively coupled thereto by first and second resistor means connected to said collector electrodes; resistor means coupling the base electrode of said first transistor means to the collector electrode of said second transistor means, first emitter-base bias means for said second transistor biasing said second transistor to cut off when said first transistor is at full collector current conduction; said first emitter-collector bias source being effective to overcome said first emitter-base bias means when said first transistor means is non-conducting to bias said second transistor means to full current conduction; Zener diode means coupling said capacitor across said base and emitter of said first transistor when the voltage across said capacitor is greater than the Zener breakdown voltage of said diode to bias said first transistor to full current conduction; second switch means for selectively short-circuiting said capacitor, upon reception of an input signal at said input terminal.

4. In combination, first voltage source means coupled to a pair of output terminals by resistor means; switch means normally short-circuiting said terminals adapted to remove said short circuit upon reception of a voltage at input terminals thereof; serially-connected timing resistor means and capacitor means coupled across second voltage source means; Zener diode means for coupling said capacitor across said input circuit when the voltage across said capacitor reaches the Zener breakdown voltage of said diode; first junction transistor means having emitter, base and collector electrodes deriving emitter-collector bias from said direct voltage source, said emitter and collector of said junction transistor means being connected to the terminals of said capacitor; second junction transistor means having emitter, collector and base electrodes; third emitter-collector bias means for said second transistor means further connected to said base of said first transistor means by coupling resistor means to bias said first transistor means to cut off when said second transistor means is rendered non-conducting, second base-collector bias means for said first transistor for rendering said first transistor non-conducting when said second transistor means is at full collector current conduction, said input terminals being connected to said emitter and base electrodes of said second transistor means so that a signal thereacross may drive said second transistor means alternately between collector current cut off and saturation.

5. In combination, first voltage source means coupled to a pair of output terminals by resistor means; switch means normally short-circuiting said terminals adapted to remove said short circuit upon reception of a voltage at input terminals thereof; serially-connected timing resistor means and capacitor means coupled across second voltage source means; first transistor means comprising base, emitter and collector electrodes; means coupling said capacitor means across said base and emitter electrodes of said first transistor means when the voltage across said capacitor is greater than a predetermined magnitude to bias said first transistor to full current conduction; second transistor means having emitter, base and collector electrodes deriving emitter-collector bias from said direct voltage source, said emitter and collector of said second transistor means being connected to the terminals of said capacitor; third transistor means having emitter, collector and base electrodes; third emitter-collector bias means for said third transistor means further connected to said base of said second transistor means by coupling resistor means to bias said second transistor means to cut off when said third transistor means is rendered non-conducting, second base-collector bias means for said second transistor for rendering said second transistor non-conducting when said third transistor means is at full collector current conduction, said input terminals being connected to said emitter and base electrodes of said third transistor means so that a signal thereacross may drive said third transistor means alternately between collector current cut-off and saturation.

6. A time delay circuit comprising, a load circuit having terminals for connecting a load thereto, first, second and third junction transistor means each having at least emitter, base and collector electrodes; said emitter and collector electrodes of said first transistor being connected to the terminals of said load circuit, bias source means coupled across said first transistor means and said load circuit by first impedance means, the emitter and collector electrodes of said second transistor being connected to the emitter and base electrodes respectively of said first transistor, second bias means connected to said base electrode of said first transistor by second impedance means; capacitor means connected to the emitter and collector electrodes of said third transistor means; third bias means connected to said capacitor and third transistor means by third resistor means, means coupling control signal means to the base of said third transistor to control the conduction state of said third transistor, and diode means having a predetermined breakdown voltage for coupling said capacitor to the base and emitter electrodes of said second transistor means to render said second transistor means conducting when the voltage across said capacitor exceeds a given value.

References Cited in the file of this patent

UNITED STATES PATENTS

| | | |
|---|---|---|
| 2,329,048 | Hullegard | Sept. 7, 1943 |
| 2,522,705 | Dewar | Sept. 19, 1950 |
| 2,600,482 | Collis et al. | June 17, 1952 |
| 2,617,024 | Hart | Nov. 4, 1952 |
| 2,688,075 | Palmer | Aug. 31, 1954 |
| 2,714,702 | Shockley | Aug. 2, 1955 |
| 2,722,649 | Immel et al. | Nov. 1, 1955 |

FOREIGN PATENTS

| | | |
|---|---|---|
| 742,967 | Great Britain | Jan. 4, 1956 |